United States Patent
Hall

[11] 3,816,085
[45] June 11, 1974

[54] DIAMOND-NONDIAMOND CARBON POLYCRYSTALLINE COMPOSITES

[75] Inventor: Howard T. Hall, Provo, Utah

[73] Assignee: Megadiamond Corporation, Provo, Utah

[22] Filed: Jan. 29, 1971

[21] Appl. No.: 111,019

[52] U.S. Cl.................. 51/307, 51/308, 264/65, 423/446
[51] Int. Cl............................................. B24d 3/02
[58] Field of Search................ 51/307, 308, 309; 23/209.1; 264/29, 84, 65; 423/446

[56] References Cited
UNITED STATES PATENTS

| | | | |
|---|---|---|---|
| 2,068,848 | 1/1937 | De Bats | 51/307 |
| 3,141,746 | 7/1964 | De Lai | 51/307 |
| 3,142,595 | 7/1964 | Wentorf | 51/307 |
| 3,297,407 | 1/1967 | Wentorf | 423/446 |
| 3,325,254 | 6/1967 | Giardini et al. | 423/446 |
| 3,348,918 | 10/1967 | Kruse | 423/446 |
| 3,399,254 | 8/1968 | Dunnington | 51/307 |
| 3,407,445 | 10/1968 | Strong | 51/307 |
| 3,423,177 | 1/1969 | Bovenkerk | 423/446 |
| 3,574,580 | 4/1971 | Stromberg et al. | 51/307 |

Primary Examiner—Donald J. Arnold
Attorney, Agent, or Firm—H. Ross Workman

[57] ABSTRACT

Diamond-nondiamond carbon polycrystalline composites particularly useful as abrasives are made by sintering diamond particles at temperatures above about 1440°K but at pressures below which diamond is stable or metastable with respect to its conversion to graphite.

3 Claims, 1 Drawing Figure

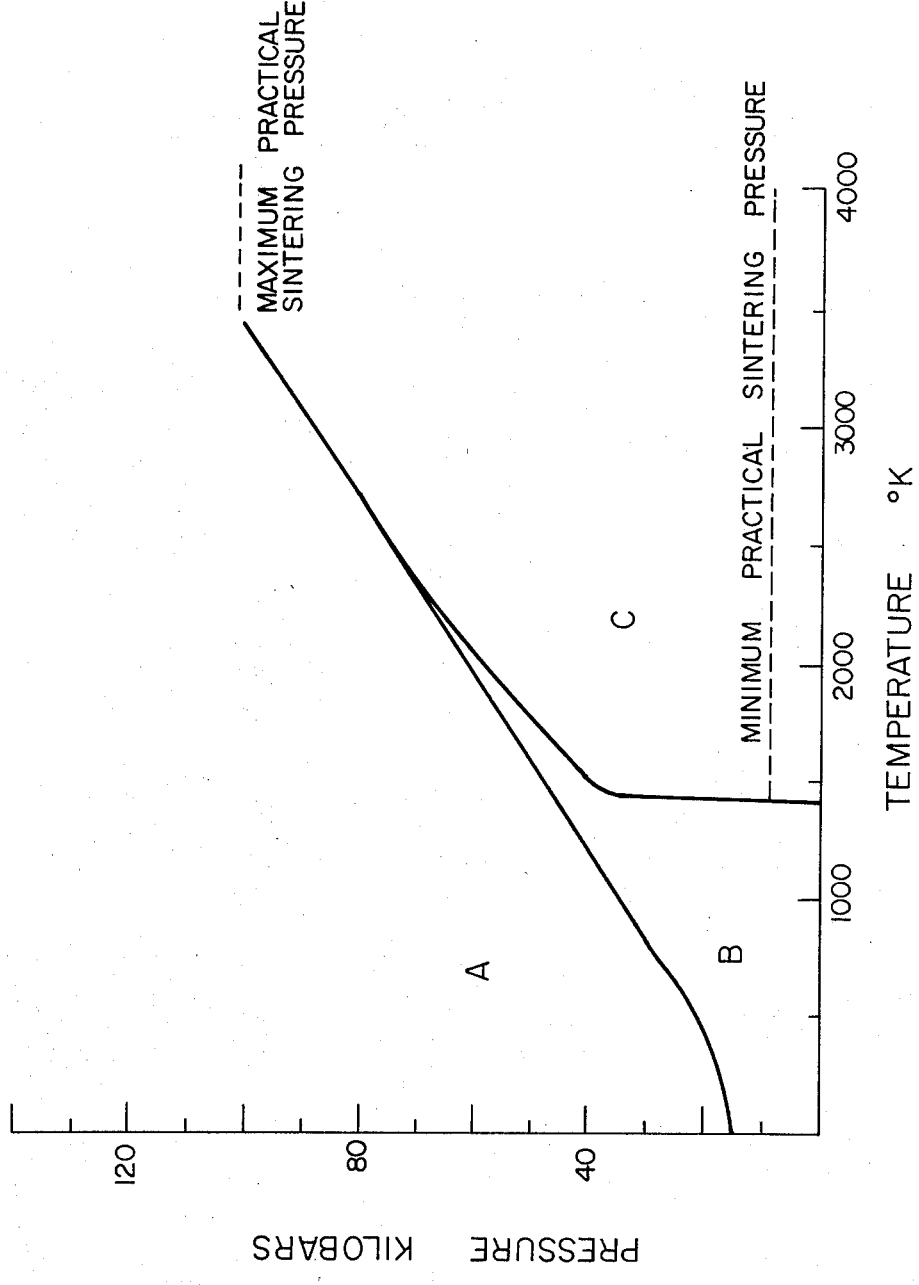

DIAMOND-NONDIAMOND CARBON POLYCRYSTALLINE COMPOSITES

This invention relates to diamond-nondiamond carbon polycrystalline composites and to methods for making such composites.

Ever since the discovery that diamond is a form of carbon, attempts have been made to synthesize diamonds from other forms of carbon. Most of these attempts have been directed to the making or growing of single crystal material equivalent to natural diamond. More recently, diamond powder, now available from both natural and synthetic sources, has been sintered to a polycrystalline composite.

U.S. Pat. No. 3,399,254 to Dunnington describes the making of polycrystalline diamond fragments from diamond particles at shock pressures of at least about 300 kilobars. My co-pending application, "Method for Sintering Diamond Particles", Ser. No. 96,312, filed Dec. 9, 1970, is directed to the preparation of unitary shaped polycrystalline diamond composites from diamond particles at lower static pressures but at temperature and pressure conditions wherein diamond is stable or metastable with respect to its conversion to graphite.

I have now discovered that diamond-nondiamond carbon polycrystalline composites particularly useful as abrasives can be made by sintering diamond particles at pressures below which diamond is stable or even metastable with respect to its conversion to graphite. Notwithstanding their preparation at relatively low pressures and their nondiamond carbon content, the composites of the present invention have excellent abrading, cutting and wear resistance qualities approaching those of natural diamond.

It is, therefore, a principal object of the present invention to provide novel diamond-nondiamond carbon polycrystalline composites and a method for the preparation of such composites. Other objects and advantages of the present invention will become apparent upon consideration of the compositions and method more fully described herein and in the accompanying drawing which is a graphical representation of the pressure-temperature range utilized in the method of the present invention.

More specifically, in its composition aspect, the present invention is a diamond-nondiamond carbon polycrystalline composite consisting essentially of 50–99 percent by weight of diamond carbon and 50–1 percent by weight of nondiamond carbon. In its process aspect, the present invention is a method for making such composites which comprises sintering together initially distinct diamond particles at a condition of pressure and temperature within area C as shown in the drawing.

Diamond powders useful in practicing the method of the present invention can be natural in origin or be produced by explosive or static pressure methods. While a relatively uniform size distribution is preferred, a mixture of various powder types, sizes and shapes may be utilized. The powder may contain minor amounts of nondiamond carbon or carbon precursors but should comprise primarily diamond carbon.

In order to produce a diamond-nondiamond carbon polycrystalline composite according to the invention, it is essential that the powder be sintered at a temperature-pressure condition falling within area C as shown in the drawing. Area C is bounded on the left by a line at about 1440°K which separates the area of diamond metastability B and above by a continuation of the line which separates the area of diamond stability A from the area in which diamond is unstable with respect to graphite. The minimum pressure required for sintering to a polycrystalline composite varies somewhat with the size, purity and surface characteristics of the powder undergoing sintering. In order to obtain a composite product useful as an abrasive, sintering should be effected above the minimum practical sintering pressure of 5 kilobars shown. Sintering times should be selected which give products having the composition desired at the pressure-temperature conditions utilized. Longer times are necessary to produce a satisfactory composite when operating at the lower left portion of area C but the time required falls to a fraction of a second as operating temperatures and pressures are raised. A particular advantage of the present method is that a polycrystalline product can be made under less drastic conditions and in a shorter time than heretofore. For example, whereas the method of my aforesaid application requires several hours of sintering at lower pressures, the present method would require only seconds to achieve an adequate product.

Since the method of the present invention is effected under conditions of temperature and pressure wherein the diamond form of carbon is unstable with respect to graphite, a portion of the diamond carbon initially present changes or reverts to nondiamond carbon. Thus, the resultant nondiamond carbon-containing composites of the present invention range from gray to generally black in color and are electroconductive. The hardness, abrasiveness, electroconductivity and related properties of these composites can be varied by controlling their nondiamond carbon content tailoring them to their intended uses, including uses as semiconductors.

It is apparent that special equipment capable of generating and withstanding the necessary operating temperatures and pressures is required to practice the method of the present invention. Apparatus such as that described in my earlier U.S. Pat. Nos. 2,918,699 (the tetrahedral press), 2,941,248 (the belt), 3,159,876 (prismatic press), and particularly a cubic press of the type illustrated in my aforesaid co-pending application Ser. No. 96,312, filed Dec. 9, 1970, are useful for this purpose.

The cubic press consists of six tungsten carbide anvils with square faces and 45° sloping shoulders. The anvils, electrically insulated from each other, are aligned for movement along three mutually perpendicular coordinate axes and synchronized in their motion by an anvil guide mechanism as described in my U.S. Pat. No. 3,182,353. Each anvil is attached to and powered by a double acting hydraulic ram affixed to a base; the bases are fastened together by an arrangement of 12 tie-rods forming the outline of a regular octahedron. The thrust of the six rams simultaneously moves the synchronized anvils towards the symmetry center of the press about a cube-shaped pyrophyllite cell having square faces approximately 60 percent greater in area than the anvil faces and parallel to the corresponding anvil faces. Further advance of the anvils extrudes and compresses pyrophyllite between the 45° sloping shoulders of the anvils generating pressure within the cell. This pressure is transmitted to the sample undergoing sintering in a sample container usually also serving as an electrical resistance heating element and in electrical contact with the anvils.

The following non-limiting examples run in a cubic press having anvils one-half inch on edge are illustrative of my method:

A molybdenum sample container 5/16 inch long having a ¼ inch outside diameter and a wall thickness of 1/100 inch was filled with 1–5 micron size diamond powder and placed in the press. The pressure was brought to 65 kilobars and then the temperature rapidly raised to about 2500°K and held there for 21 seconds. Current flow was stopped, the temperature in the container quickly dropped to near room temperature, and then the pressure was released. A dark steel-gray cylinder, 0.19 inch long by 0.23 inch in diameter weighing 2.5 carats was removed from the sample container. The product was an electroconductive polycrystalline diamond-nondiamond carbon composite containing approximately 11 percent by weight of nondiamond carbon. It was extremely hard, abrasive and wear resistant.

A similar run using 1–40 micron size diamond powder yielded a comparable product but of increased density.

A cubic press with anvils ½ inch on edge was again used but the sample container was a graphite tube 5/16 inch long and 3/16 inch in diameter. The sample container was filled with less than 1 micron size diamond powder, the pressure was brought to 35 Kilobar and then the temperature raised to about 3000°K for about 2 seconds. Heating was discontinued, the system cooled and the pressure released. A black electroconductive composite containing about 30 percent by weight of nondiamond carbon and weighing 1.2 carats was removed from the sample container. Similar composites containing up to 50 percent by weight of nondiamond carbon were still extremely cohesive. Although progressively less hard, abrasive and wear resistant, the higher nondiamond carbon-containing composites possessed these qualities and were adequate for industrial use as abrasives.

The diamond-nondiamond product of the present invention is a unitary shaped polycrystalline composite conforming to the shape of the mold in which it is prepared. My method avoids the tedious steps of cutting, polishing and the like required to shape natural materials. Composites according to the present invention have been made in various desired configurations including some with hollow central portions.

Other variations in my invention will suggest themselves to those skilled in the art and my invention is as claimed:

I claim:

1. A diamond-nondiamond carbon polycrystalline composite consisting essentially of 50–99 percent by weight of diamond particles which are sintered to adjacent diamond particles forming diamond-to-diamond bonds and nondiamond carbon in an amount of about 50–1 percent by weight interspersed in voids between the sintered diamond particles the nondiamond carbon reverting from diamond carbon by exposing the diamond carbon to temperature and pressure conditions in which diamond is unstable.

2. A method for making a diamond-nondiamond carbon polycrystalline composite consisting essentially of 50–99 percent by weight of diamond and 50–1 percent by weight of nondiamond carbon which comprises sintering together initially distinct diamond particles at a condition of pressure and temperature in which the diamond is simultaneously (a) thermodynamically unstable with respect to graphite and (b) capable of sintering and for a time increment less than that resulting in conversion of the diamond in the polycrystalline composite to below 50 percent by weight.

3. A method for making a diamond-nondiamond carbon polycrystalline compact which comprises heating initially distinct diamond particles under a pressure between about 5 kilobars and about 100 kilobars and at a temperature at which diamond is thermodynamically unstable under such pressure with respect to conversion to graphite until from 1 to 50 percent of the diamond is converted to nondiamond carbon.

* * * * *